United States Patent
Kawama et al.

(10) Patent No.: US 7,346,327 B2
(45) Date of Patent: Mar. 18, 2008

(54) WIRELESS RECEIVING CIRCUIT AND WIRELESS PORTABLE DEVICE

(75) Inventors: Shuichi Kawama, Kyoto (JP); Kunihiko Iizuka, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 550 days.

(21) Appl. No.: 11/062,447

(22) Filed: Feb. 22, 2005

(65) Prior Publication Data
US 2005/0186935 A1 Aug. 25, 2005

(30) Foreign Application Priority Data
Feb. 23, 2004 (JP) ............................. 2004-046795

(51) Int. Cl.
*H04B 1/10* (2006.01)
(52) U.S. Cl. ...................... 455/307; 455/323; 455/339
(58) Field of Classification Search ................ 455/307, 455/323, 324, 341, 339, 338, 337
See application file for complete search history.

(56) References Cited

U.S. PATENT DOCUMENTS

| | | | |
|---|---|---|---|
| 4,944,025 A * | 7/1990 | Gehring et al. | 455/207 |
| 5,918,168 A * | 6/1999 | Abe et al. | 455/315 |
| 5,999,802 A * | 12/1999 | Aschwanden | 455/196.1 |
| 6,236,847 B1 * | 5/2001 | Stikvoort | 455/313 |
| 6,631,170 B1 * | 10/2003 | Gu | 375/316 |
| 7,236,762 B2 * | 6/2007 | Asikainen et al. | 455/323 |
| 2002/0081990 A1 * | 6/2002 | Asikainen et al. | 455/324 |

FOREIGN PATENT DOCUMENTS

EP 1 081 871 A1 7/2001

* cited by examiner

*Primary Examiner*—Edward F. Urban
*Assistant Examiner*—Christian A. Hannon
(74) *Attorney, Agent, or Firm*—Birch, Stewart, Kolasch & Birch, LLP

(57) ABSTRACT

A wireless receiving circuit includes a mixer, a buffer, an active low-pass filter, and a second order passive low-pass filter which are connected between a signal input terminal and a signal output terminal. The second order passive low-pass filter is for removing an interfering wave that cannot be removed by the active low-pass filter. In the wireless receiving circuit, a first capacitor and a second capacitor are provided. The first capacitor has one terminal connected to an input terminal of the buffer and the other terminal grounded. The second capacitor has one terminal connected to an output terminal of the buffer and the other terminal grounded. These two kinds of capacitors function as the second order passive low-pass filter by being combined with input and output impedance of elements provided on the upstream side and downstream side of the capacitors. Thus provided are (i) a wireless receiving circuit that can be integrated into an integrated circuit, can reduce power consumption, and can be designed easily, and (ii) a wireless portable device using the wireless receiving circuit.

15 Claims, 6 Drawing Sheets

WIRELESS RECEIVING CIRCUIT AND WIRELESS PORTABLE DEVICE

This nonprovisional application claims priority under 35 U.S.C. § 119(a) on Patent Application No. 046795/2004 filed in Japan on Feb. 23, 2004, the entire contents of which are hereby incorporated by reference.

FIELD OF THE INVENTION

The present invention relates to a wireless receiving circuit, and a wireless portable device using the wireless receiving circuit. More specifically, the present invention relates to a wireless receiving circuit suitable as a wireless receiving circuit of a direct conversion architecture or a low IF architecture that performs frequency conversion of high-frequency wireless signals received by an antenna into a baseband signal or an intermediate frequency signal (a signal at a low frequency about several times higher than a baseband signal range) so as to pick up a signal of a desired channel, and relates to a wireless portable device (e.g. a mobile phone, a portable telereceiver, or the like) using the wireless receiving circuit.

BACKGROUND OF THE INVENTION

Conventionally, wireless receiving circuits used in wireless portable devices (e.g. mobile phones, portable telereceivers, and the like) have been primarily those of a heterodyne architecture. In recent years, receiving circuits of a direct conversion architecture or a low IF (Intermediate Frequency) architecture are also used. A receiving circuit referred to here is a so-called tuner, which is a circuit for picking up a signal of a desired channel from all high-frequency signals received by an antenna and converting the picked up signal into a baseband signal having a sufficient amplitude.

A receiving circuit of the heterodyne architecture is advantageous in that it can remove an interfering wave other than a desired channel almost completely by (i) an intermediate frequency circuit having one or two stages and (ii) filters provided on the upstream side and downstream side of the intermediate frequency circuit. A receiving circuit of the heterodyne architecture having a one-stage intermediate frequency circuit is called a single-conversion-method receiving circuit, and a receiving circuit of the heterodyne architecture having a two-stage intermediate frequency circuit is called a double-conversion (or dual-conversion)-method receiving circuit.

On the other hand, a receiving circuit of the direct conversion architecture can hardly remove the interfering wave, and the interfering wave is inputted to a baseband circuit. Therefore, the receiving circuit of the direct conversion architecture requires a filter, provided on the upstream side of the baseband circuit, that has a steep attenuation characteristic and a saturation-resistant characteristic for sufficiently attenuating a high-power interfering wave. The merit of the receiving circuit of the direct conversion architecture is its low power consumption owing to its simple circuit arrangement. Because of this merit, the receiving circuit of the direct conversion architecture is used as a wireless receiving circuit for the wireless portable devices.

Although a receiving circuit of the low IF architecture uses the single conversion method, it has almost the same features as the receiving circuit of the direct conversion architecture. This is because an intermediate frequency is a low frequency about several times higher than a baseband signal range. Therefore, in the following, a receiving circuit of the low IF architecture is implicitly included in the receiving circuit of the direct conversion architecture, unless otherwise noted. Hence, in the following, a baseband circuit includes an intermediate frequency circuit of a low frequency several times higher than the baseband signal range, unless otherwise noted.

Conventionally, in the receiving circuit of the direct conversion architecture, a filter provided on the upstream side of the baseband circuit is made by combining a plurality of receiving elements, such as a passive low-pass filter (including an inductor and a capacitor, or a resister and a capacitor) and an active low-pass filter (a transistor or the like) (see, for example, International Patent Publication WO 00/51251, published on Aug. 31, 2000, pp. 16-21 and FIGS. 12-19; also published as EP1081871A1).

Specifically, as shown in FIG. 6, this receiving circuit includes an antenna 41, a band pass filter 42, a low-noise amplifier 43, two mixers 45, 46, a voltage control oscillator (VCO) 44, and a baseband circuit 51. The antenna 41 receives high-frequency wireless signals. The band pass filter 42 allows passage of only a signal in a predetermined frequency range required by the receiving circuit, among the high-frequency wireless signals received by the antenna 41. The low-noise amplifier 43 amplifies the signal that has passed through the pass filter 42. The mixers 45, 46 mix the output signal of the low-noise amplifier 43 with signals at a local oscillation frequency (local oscillation signals), so as to downconvert the output signal of the low-noise amplifier 43 into baseband signals I and Q. The VCO 44 generates two signals having a 90-degree phase difference at a frequency equal to the center frequency of the desired channel, and supplies these signals to the two mixers 45, 46, as signals of the local oscillation frequency. The baseband circuit 51 processes the baseband signals I and Q.

Two kinds of passive low-pass filters (passive low-pass filters 59, 60 and passive low-pass filters 61, 62) and one kind of active low-pass filters 49, 50 are provided on the upstream side of the baseband circuit 51, that is, between the mixers and the base band circuit 51. Among the two kinds of passive low-pass filters 59, 60, and 61, 62, the passive low-pass filters 59, 60 remove an interfering wave at a frequency higher than adjacent channels (channels that are adjacent to the desired channel). The passive low-pass filters 61, 62 remove a high-frequency interfering wave to which the active low-pass filters 49, 50, which are provided as a next stage, will be ineffective (that is, a high-frequency interfering wave that will not be removed by the low-pass filters 49, 50). The low-pass filters 49, 50 remove interfering waves in the adjacent channels.

If a receiving circuit is ultimately provided on a single chip, that is, if the receiving circuit is provided on the same substrate as an IC, the receiving circuit occupies only a small area, and costs for parts become lower. Therefore, it is desired to provide the receiving circuit of portable wireless devices, such as mobile phones and portable telereceivers, on a single chip. To realize this, power consumption of the receiving circuit must be low, because the portable wireless devices must function with internal batteries only.

Therefore, an object of the present invention is to provide main circuits of the receiving circuit, which is of the direct conversion architecture or the low IF architecture, on about one or two IC chips, and for this purpose, to provide low-pass filters within the receiving circuit, on the upstream side of a baseband circuit or a low/intermediate frequency circuit, without involving additional power consumption by the filters. In reality, it will not be attained soon to provide on one chip the entire receiving circuit, including such members as an antenna and a bypass capacitor, which prevents (i) voltage fluctuation between a power source and a ground and (ii) mixture of noises. Therefore, the present invention aims at providing main circuits on one or two IC chips.

In integrating the receiving circuit of FIG. 6 into an IC, there are problems with the low-pass filters 59 to 62, which include capacitors and inductors. Even if a cutoff frequency of these filters is about 10 MHz, the inductance of the inductors are about several μH if the capacitances of the capacitors are several dozen pF. It is nearly impossible to provide the inductors having such inductance on the same IC substrate as other elements.

To solve this problem, one conceivable way is to replace the inductors by resistors, which can attain relatively a wide range of values (resistance values) within an IC, and to realize the low-pass filters by resisters and capacitors.

However, while ideally the low-pass filters realized by inductors and capacitors do not cause a loss of electric power, the low-pass filters realized by resistors and capacitors cause a loss of electric power, because of the resistors. In some causes, it can be assumed that the signal source for the low-pass filters is only voltage or current. Even in such cases, there is a loss of signal voltage or signal current, because of the resistors. Therefore, it is necessary to consider the loss of signal power, voltage, or current caused by inserting the low-pass filters including resistors and capacitors (so-called insertion loss), in designing not only the low-pass filters but also circuits provided on the upstream side and downstream side of the low-pass filters. As a result, a new amplifier circuit is required. Moreover, because of the loss of signal power, voltage, or current, it is necessary, in designing the receiving circuit, to consider impedance matching between input and output impedance of the low-pass filters and the impedance of the circuits provided on the upstream side and downstream side of the low-pass filters. Since the filters do not include inductors, the impedance matching cannot be performed by adjusting inductors. Therefore, for the purpose of impedance matching, it is necessary to provide buffers such as active impedance conversion circuits (e.g. emitter follower circuits, source follower circuits, and the like) on the upstream side and downstream side of the low-pass filters. The addition of the amplifier circuit and the buffers leads to increase of power consumption.

Thus, if the receiving circuit includes high order passive low-pass filters realized by resistors and capacitors, it is difficult to reduce power consumption of the receiving circuit and to integrate the receiving circuit into an IC. In addition, it is very difficult to design the passive low-pass filters and the circuits provided on the upstream side and downstream side of the low-pass filters.

SUMMARY OF THE INVENTION

The present invention was made in view of the foregoing conventional problems. An object of the present invention is to provide a wireless receiving circuit that can be integrated into an integrated circuit, can operate with lower power consumption, and can be designed easily, and to provide a wireless portable device using the wireless receiving circuit.

To solve the foregoing problems, a wireless receiving circuit of the present invention for downconverting (lowering frequencies of) high-frequency wireless signals received by an antenna and picking up a signal of a desired channel, the wireless receiving circuit includes: a first element, a second element, and a third element serially connected in this order between a signal input terminal and a signal output terminal; a first capacitor, one terminal of which is connected to an input terminal of the second element; and a second capacitor, one terminal of which is connected to an output terminal of the second element, the first capacitor and the second capacitor functioning as a second order low-pass filter by being combined with output impedance of an element immediately preceding the first capacitor and the second capacitor, and input impedance of an element immediately following the first capacitor and the second capacitor.

In this specification, an "element" includes not only a functional block consisting of a group of elements that perform a certain function by themselves, but also one or a group of plural elements constituting a functional block. An "element immediately preceding (the first capacitor and the second capacitor)" is an element having an output terminal connected to one terminal of the first capacitor or the second capacitor, and an "element immediately following (the first capacitor and the second capacitor)" is an element having an input terminal connected to one terminal of the first capacitor or the second capacitor.

The first capacitor may be connected to the output terminal of the first element directly or may be connected through another element. The second capacitor may be connected to an input terminal of the third element directly or may be connected through another element.

The wireless receiving circuit of the present invention is particularly suitable as a wireless receiving circuit of a direct conversion architecture, which downconverts high-frequency wireless signals received by an antenna and picks up a signal of a desired channel, and as a wireless receiving circuit of a low IF architecture, which downconverts high-frequency wireless signals received by an antenna into an intermediate frequency signal at a low frequency (an intermediate frequency signal at a frequency about several times higher than a baseband signal range) and picks up a signal of a desired channel.

A wireless portable device of the present invention includes the wireless receiving circuit of the present invention.

For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
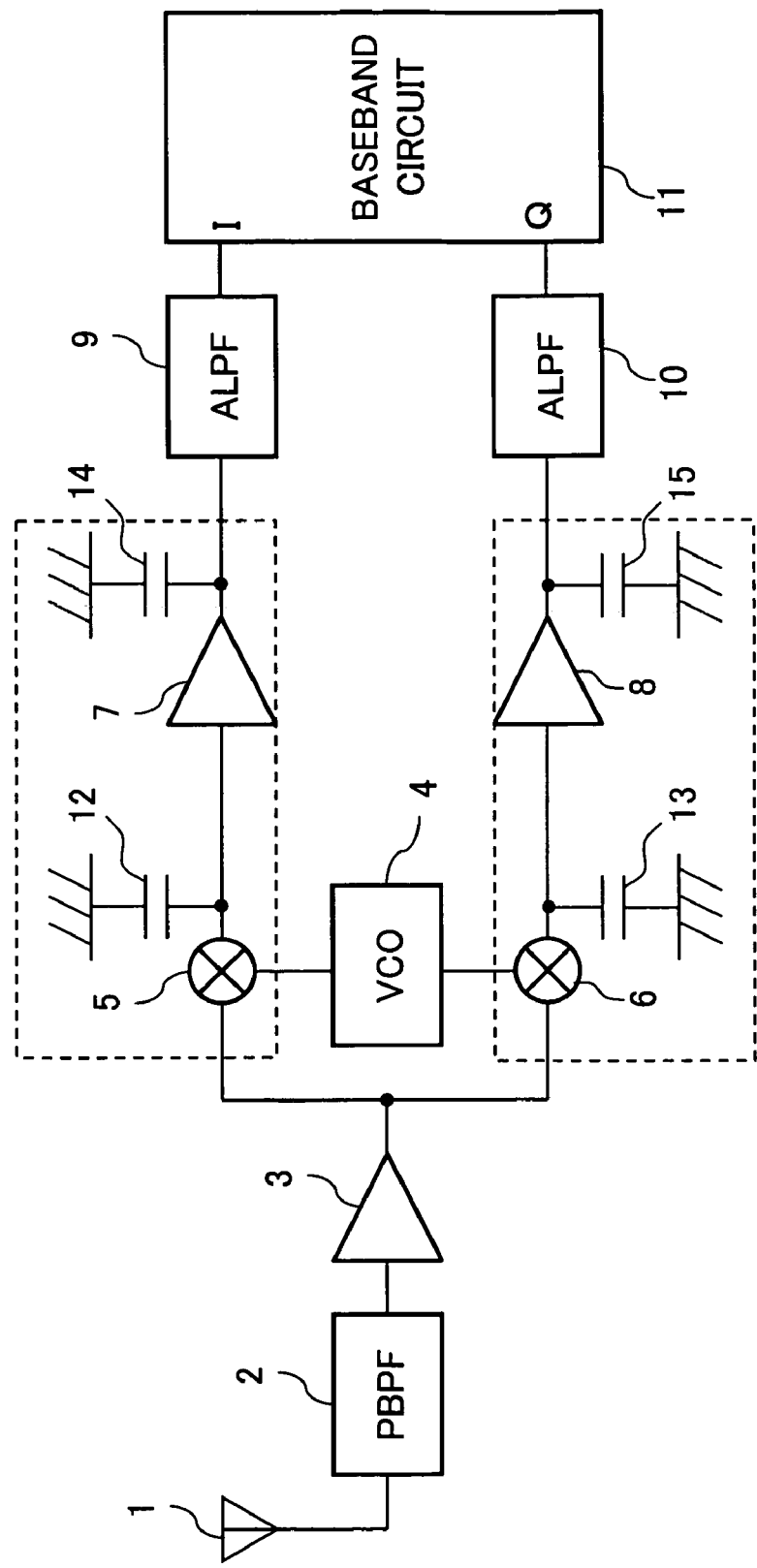
FIG. 1 is a block diagram illustrating an arrangement of a wireless receiving circuit in accordance with a first embodiment of the present invention.

With reference to the drawings, the following specifically describes wireless receiving circuits in accordance with embodiments of the present invention. FIG. 1 is a block diagram illustrating an arrangement of a wireless receiving circuit of the direct conversion architecture in accordance with a first embodiment of the present invention.

As shown in FIG. 1, the wireless receiving circuit of the direct conversion architecture in accordance with the present embodiment includes an antenna 1, a passive band pass filter 2, a low-noise amplifier 3, a voltage control oscillator (VCO) 4, two mixers (a first element) 5, 6, buffers (buffer amplifiers; a second element) 7, 8, active low-pass filters (active filters) 9, 10, and a baseband circuit 11. The antenna 1 receives high-frequency wireless carrier waves as high-frequency wireless signals. The passive band pass filter 2 allows passage of only a signal in a predetermined frequency range required by the present wireless receiving circuit, among the high-frequency wireless signals received by the antenna 1. The low-noise amplifier 3 amplifies the signal that has passed through the passive band pass filter 2. The base band circuit 11 demodulates baseband signals I and Q.

Between (i) the antenna 1 (signal input terminal) for receiving the high-frequency wireless signals and (ii) a signal output terminal for outputting a demodulated signal (an output terminal of the baseband circuit 11), the antenna 1, the band pass filter 2, the low-noise amplifier 3, the voltage control oscillator (VCO) 4, the mixer 5, the buffer 7, the active low-pass filter 9, and the baseband circuit 11 are serially connected in this order, and the antenna 1, the band pass filter 2, the low-noise amplifier 3, the voltage control oscillator (VCO) 4, the mixer 6, the buffer 8, the active low-pass filter 10, and the baseband circuit 11 are serially connected in this order.

The voltage control oscillator (VCO) 4 generates two signals having a 90-degree phase difference at a frequency equal to a center frequency of a desired channel, and supplies the two signals to the two mixers 5, 6, as signals at a local oscillation frequency. The mixers 5, 6 mix the output signal of the low-noise amplifier with the signals at local oscillation frequencies (local oscillation signals), so as to downconvert the output signal into baseband signals. The active low-pass filters 9, 10 remove an interfering wave that is in a frequency range other than the desired channel from the baseband signals.

The passive band pass filter 2 attenuates frequency components of the high-frequency wireless signals received by the antenna 1 that are not in a frequency range required by the present wireless receiving circuit. The low-noise amplifier 3 amplifies the signal that has passed through the band pass filter 2. The low-noise amplifier 3 may have a variable gain. That is, the low-noise amplifier 3 may be arranged so that the gain is adjustable to attain a desired amplitude of the signal of the desired channel, for example. The voltage control oscillator 4 generates two signals having a 90-degree phase difference at the frequency equal to the center frequency of the desired channel, and supplies the two signals to the two mixers 5, 6, as the signals of a local oscillation frequency. At the mixers 5, 6, the output of the low-noise amplifier 3 is downconverted by being mixed with the signals of a local frequency, so as to become an inphase signal (signal I) and a quadrature signal (signal Q), which are two baseband signals having a 90-degree phase difference. In the present embodiment, the output signal of the mixer 5 is the inphase signal (signal I), and the output signal of the mixer 6 is the quadrature signal (signal Q).

On the output side of the mixers 5, 6, the buffers 7, 8 are provided, respectively. This is because, if the mixers 5, 6 and the active low-pass filters 9, 10 are connected directly, the mixers 5, 6 and the active low-pass filters 9, 10 could fail to operate normally in such cases where, for example, input impedance of the active low-pass filters 9, 10 are low, or DC (direct current) voltages at output terminals of the mixers 5, 6 are different from DC voltages at input terminals of the active low-pass filters 9, 10. Simplest examples of the buffers 7, 8 are emitter follower circuits, source follower circuits, and the like.

In order to remove the interfering wave that is not in the desired channel from the baseband signals, the active low-pass filters 9, 10 have steep low-pass characteristics, with a passing band having substantially the same bandwidth as the desired channel.

In the direct conversion architecture, the local oscillation signals generated by the voltage control oscillator 4 could leak into the output of the low-noise amplifier 3, cause self-mixing at the mixers 5, 6, and fluctuate DC components of the outputs of the mixers 5, 6. In order to remove fluctuations of the DC components, the active low-pass filters 9, 10 may be replaced with band pass filters.

The signals of the desired channel that have passed through the active low-pass filters 9, 10 are demodulated at the baseband circuit 11.

The receiving circuit of FIG. 1 can be applied to a low IF architecture, by changing the signals of local oscillation frequency so that the high-frequency signals are downconverted by the mixers 5, 6 into intermediate-frequency signals at a low frequency about several times higher than the baseband signal range. In the case where the receiving circuit of FIG. 1 is applied to the low IF architecture, the baseband circuit 11 downconverts the intermediate-frequency signals from the intermediate frequency to a baseband frequency, before performing signal demodulation processing.

As a feature of the wireless receiving circuit of the present invention, capacitors 12 to 15 are connected between outputs of the mixers 5, 6 and the ground of the wireless circuit, and between outputs of the buffers 7, 8 and the ground of the wireless circuit. More specifically, each of the capacitors 12 and 13 has one terminal connected to the output terminal of the mixer 5 or 6 (that is, connected to the input terminal of the buffer 7 or 8) and the other terminal grounded. Each of the capacitors 14 and 15 has one terminal connected to the output of the buffer 7 or 8 (that is, connected to the input terminal of the active low-pass filter 9 or 10) and the other terminal grounded.

Figure 2:
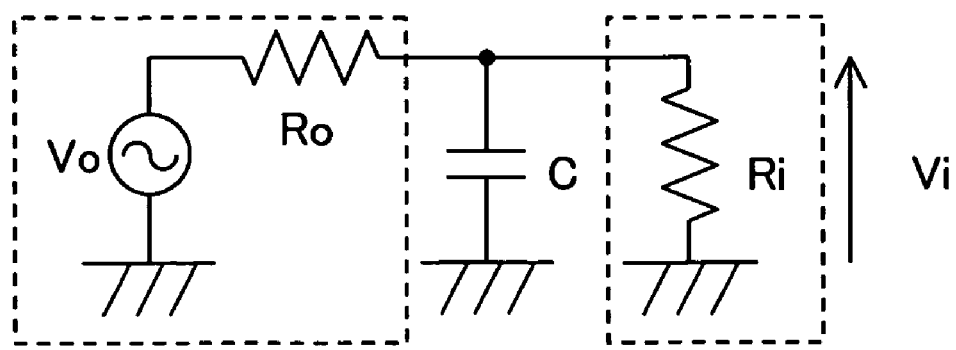
FIG. 2 is a circuit diagram illustrating an arrangement of a filter realized by (i) one of a plurality of capacitors that are a part of a distributed filter of the wireless receiving circuit, which shows a filtering characteristic, (ii) an output side of a circuit preceding the capacitor, and (iii) an input side of a circuit following the capacitor, and the circuit diagram is for explaining a filtering characteristic of the filter.

The capacitors 12 to 15 function as low-pass filters by being combined with input and output impedance of the circuits connected on the upstream side and downstream side of the capacitors 12 to 15. That is, the capacitors 12 to 15 function as low-pass filters by being combined with output impedance of an element directly preceding the capacitors 12 to 15 (a preceding-stage circuit), that is, the mixers 5, 6 and the buffers 7, 8, and input impedance of an element directly following the capacitors 12 to 15 (a following-stage circuit), that is, the buffers 7, 8 and the active low-pass filters 9, 10. This is explained with reference to FIG. 2. FIG. 2 is a circuit diagram for explaining a filtering characteristic of a filter realized by (i) one of a plurality of capacitors that is a part of a distributed filter of the wireless receiving circuit, which shows filtering characteristics, and (ii) the output side of the preceding-stage circuit of the capacitor and the input side of the following-stage circuit of the capacitor. In FIG. 2, the preceding-stage circuit and the following-stage circuit are illustrated schematically as resistor components only.

The capacitors 12 to 15 are capacitors C having a capacitance C, and the resister component on the output side of the preceding-stage circuit (one of the mixers 5, 6 and the buffers 7, 8) of the capacitors C is shown as a serial connection of (i) a voltage source Vo having a voltage Vo and (ii) an output resistor Ro having a resistance value Ro. Meanwhile, the resistor component on the input side of the following-stage circuit (one of the buffers 7, 8 and the active low-pass filters 9, 10) of the capacitors C is an input resistor Ri having a resistance value Ri. Then, a voltage Vi that appears at both ends of the input resistor Ri is represented by the following formula:

$$Vi=RiVo/(Ri+Ro+j\omega RiRoC) \qquad (1)$$

where j is an imaginary number, and ω is an angular frequency of the voltage source Vo. From this formula, it is found that the circuit of FIG. 2 functions as a first order low-pass filter whose cutoff frequency is $(Ri+Ro)/2\pi RiRoC$. In other words, it is found that each of the capacitors 12 to 15 functions as a first order low-pass filter. Thus, the wireless receiving circuit of FIG. 1 includes a second order low-pass filter realized by the capacitors 12, 14, and a second order low-pass filter realized by the capacitors 13, 15.

Next, operation of the filter realized by the capacitors 12 to 15 and positioned in a distributed manner (hereinafter referred to as a "distributed filter") is described in detail.

If the level of an interfering wave is high, there are cases where the passive band pass filter 2 of the wireless receiving circuit can hardly attenuate the interfering wave. For example, if someone uses a mobile phone in close vicinity to a person using a portable telereceiver including the wireless receiving circuit, the antenna 1 receives not only TV broadcast signals in a frequency range of about 100 MH to 700 MHz, but also signals in a frequency range of 800 MHz to 1.9 GHz transmitted by the mobile phone. At this time, the input level of the interfering wave could be equal to or higher than 100 dB of the TV broadcast signals. In such a case, even if the interfering wave is attenuated by the passive band pass filter 2, the interfering wave subjected to frequency conversion by the mixers 5, 6 is inputted to the active low-pass filters 9, 10 at a still high level. Since the interfering wave has a considerably high frequency (i.e. 100 MHz or higher) even after the frequency conversion, the filtering function of the active low-pass filters 9, 10 does not work. As a result, the interfering wave is directly inputted to the baseband circuit 11. This hinders the demodulation of the signal of the desired channel.

Therefore, it is preferable to set a cutoff frequency of the distributed filter, which is realized by the capacitors 12 to 15, so that the attenuation becomes as large as possible at the frequency of the interfering wave. Note that, in order to prevent influence of the attenuation on the passing band of the low-pass filters 9, 10, it is preferable to set the cutoff frequency of the distributed filter, which are realized by the capacitors 12 to 15, to be at least about ten times higher than a cutoff frequency of the active low-pass filters 9, 10.

Next, procedures for designing the distributed filter realized by the capacitors 12 to 15 are described.

First, in a circuit having the same arrangement as the wireless receiving circuit of FIG. 1 except that the capacitors 12 to 15 are not provided, the mixers 5, 6, the buffers 7, 8, and the active low-pass filters 9, 10 are desired by an ordinary design method. Then, input and output impedance of each circuit (i.e. the mixers 5, 6, the buffers 7, 8, and the active low-pass filters 9, 10) is calculated. The impedance can be calculated easily by using an analog circuit simulator. After that, from the set cutoff frequencies and the input and output impedance of each circuit (i.e. the output impedance of the mixers 5, 6, the input and output impedance of the buffers 7, 8, and the input impedance of the active low-pass filters 9, 10), capacitances required for the capacitors 12 to 15 are calculated approximately. Next, in a circuit including the capacitors 12 to 15, that is, the wireless receiving circuit of FIG. 1, frequency characteristics are calculated by using the analog circuit simulator, and the capacitances of the capacitors 12 to 15 are adjusted so as to attain optimal frequency characteristics.

As described above, the wireless receiving circuit of the present embodiment does not use inductors for the filters, unlike the conventional wireless receiving circuit provided with a second order LC filter. Therefore, except the antenna 1 (and in some cases the passive band pass filter 2 and the like), main circuits can be provided on one chip as an IC. In addition, unlike the case where the second order LC filter in the conventional wireless receiving circuit is replaced by a second order RC filter, it is not necessary for the filter to have buffers between the filter and the preceding-stage circuit and between the filter and the following-stage circuit, for the purpose of impedance matching between the filter and the preceding-stage circuit and between the filter and the following-stage circuit. Furthermore, in designing the preceding-stage circuit and the following-stage circuit, it is not necessary to consider a loss in the filter, and it is not necessary to add an amplifier circuit to compensate for the loss in the filter. Therefore, it is possible to reduce the burden of design of the wireless receiving circuit, prevent the loss of signal power, voltage, or current from being caused by the filter, and make it unnecessary to add such members as buffers and an amplifier circuit. As a result, it is possible to reduce power consumption. In the case of using a digital demodulation method in demodulating the wireless signals received by the wireless receiving circuit, the baseband circuit 11 can include an amplifier (which is an analog circuit), an analog/digital (A/D) conversion circuit, and a digital circuit. Therefore, if the main circuits of the wireless receiving circuit of FIG. 1, except the antenna 1, or except the antenna 1 and the passive band pass filter 2, are to be integrated into an IC, there are cases where it is preferable to integrate the main circuits not into one chip but into two chips (an analog IC chip on which those circuits that are on the upstream side of the analog circuits of the baseband circuit 11 are provided, and a digital IC chip on which the digital circuit, which is on the downstream side of the analog/digital conversion circuit, is provided). According to this arrangement, it is possible to prevent noises of the digital circuit from adversely influencing the analog circuit. While the minimum size of analog IC process cannot be reduced easily, the minimum size of digital IC process is still becoming smaller and smaller. Therefore, unlike the case where the analog circuit and the digital circuit are integrated into one chip, the size of the wireless receiving circuit as a whole can be reduced if the analog circuit and the digital circuit are integrated into two chips, because the size of the digital IC chip can be reduced. Therefore, it is possible, for example, to reduce the cost of the wireless receiving circuit as a whole and the area occupied by the wireless receiving circuit as a whole on a substrate provided inside a wireless portable device.

Second Embodiment

Figure 3:
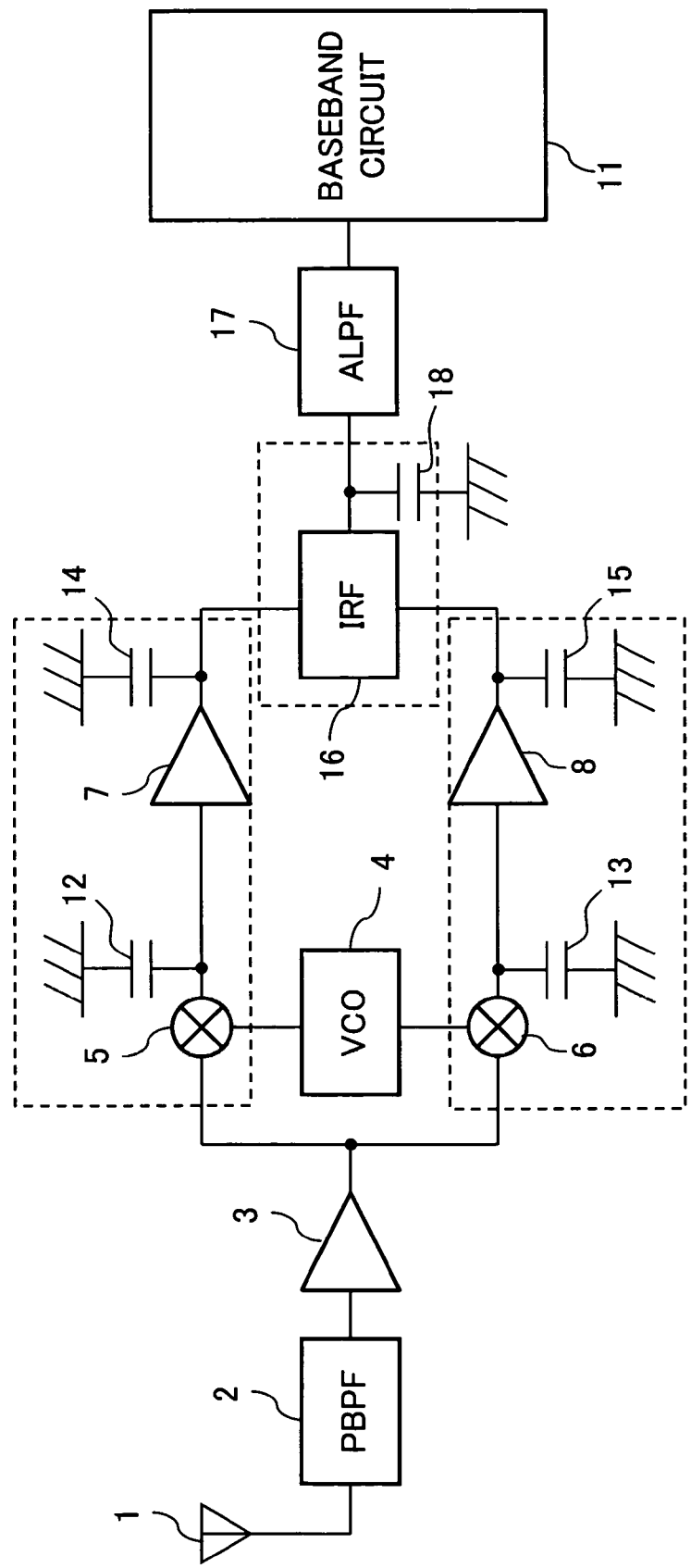
FIG. 3 is a block diagram illustrating an arrangement of a wireless receiving circuit in accordance with a second embodiment of the present invention.

As a second embodiment of the present invention, a wireless receiving circuit particularly suitable as a wireless receiving circuit of the low IF architecture is described. The wireless receiving circuit of the low IF architecture is shown in FIG. 3. For the purpose of explanation, members whose functions are identical to those of the members described in the first embodiment are denoted by the same reference numerals, and these members are not explained here.

The wireless receiving circuit of the present invention has the same arrangement as the wireless receiving circuit of the first embodiment, except that an image rejection filter 16 is provided as a third element, instead of the active low-pass filters 9, 10.

In the wireless receiving circuit of the low IF architecture, a signal component at an image frequency (an image signal) could be mixed into the signals of an intermediate frequency, at the time of downconversion to the signals of an intermediate frequency. Therefore, in applying the receiving circuit of FIG. 1 to the wireless receiving circuit of the low IF architecture, it is preferable that the baseband circuit 11 performs processing for removing an interfering wave at the image frequency, from the quadrature signals (signals I and Q) generated by the two mixers 5, 6.

On the other hand, in the wireless receiving circuit of the present embodiment, as shown in FIG. 3, the image rejection filter is provided on the downstream side of the buffers 7, 8. Specifically, the image rejection filter 16 is connected to the output terminals of the buffers 7, 8 and to the input terminal of an active low-pass filter 17. The image rejection filter 16 removes the image signal in the IF range from the two quadrature signals, and outputs a single signal. At this time, since the output of the image rejection filter 16 is not the quadrature signals (signals I and Q) but the single signal, only one active low-pass filter 17 is provided in order to remove the interfering wave at a frequency higher than the intermediate frequency range. The output signal of the active low-pass filter 17 does not need low-frequency components lower than the intermediate frequency range. Therefore, an active band-pass filter that also removes the low-frequency components may be used instead of the active low-pass filter 17. In the wireless receiving circuit of the present embodiment, as shown in FIG. 3, a capacitor 18 is provided on the downstream side of the image rejection filter 16, as a capacitor of the filter using formula (1). The capacitor 18 functions as a low-pass filter by being combined with output impedance of the image rejection filter 16, which is an element directly preceding the capacitor 18, and input impedance of the active low-pass filter 17, which is an element directly following the capacitor 18. As a result, the filter realized by the capacitors 12 to 15 and 18 is a third order filter.

In the wireless receiving circuit of the present embodiment, the capacitor 18, one terminal of which is connected to the output terminal of the image rejection filter 16, is provided in addition to the capacitors 12 to 15. The capacitors 12 to 15 and 18 function as a third order low-pass filter by being combined with output impedance of the elements directly preceding the capacitors 12 to 15 and 18 (the mixers 5, 6, the buffers 7, 8, and the image rejection filter 16) and the elements directly following the capacitors 12 to 15 and 18 (the buffers 7, 8, the image rejection filter 16, and the active low-pass filter 17).

The distributed filter realized by the capacitors 12 to 15 and 18 is designed by the same method used in designing the distributed filter of the wireless receiving circuit of FIG. 1 realized by the capacitors 12 to 15.

As described above, in the wireless receiving circuit of the present embodiment, each of the capacitors 12 to 15 and 18 is connected between the output terminal of a functional block (the mixer 5 or 6, the buffer 7 or 8, or the image rejection filter 16) and the ground. In this way, it is possible to realize a first order low-pass filter by the capacitors 12 to 15 and 18 and the input and output impedance of the circuits provided on the upstream side and downstream side of the capacitors 12 to 15 and 18.

The influences of the capacitors 12 to 15 and 18 appear only as attenuation of high-frequency components. The frequencies of the high-frequency components to be attenuated can be controlled by adjusting the magnitudes (capacitances) of the capacitors 12 to 15 and 18. The frequencies of the high-frequency components to be attenuated are between several MHz and 1 GHz, approximately. Even at maximum, the capacitances of the capacitors 12 to 15 and 18 rarely exceed 100 pF. This means that the capacitors 12 to 15 and 18 can be provided inside an IC. If the capacitances of the capacitors 12 to 15 and 18 are such values that do not influence a desired frequency range, providing the capacitors 12 to 15 and 18 does not influence other circuits. Therefore, in the case where the second order LC filter is replaced by a second order RC filter in the conventional wireless receiving circuit, it is possible to reduce the insertion loss in the passive filters and the burden of considering impedance matching, which are problems faced in designing the receiving circuit. In other words, it is not necessary to consider, in designing the wireless receiving circuit, the impedance matching between the filters and the circuits provided on the upstream side and downstream side of the filters, or to add buffers or the like. This is effective for reducing the development period for the wireless receiving circuit and the power consumption by the wireless receiving circuit. These are important effects for the wireless portable device using the wireless receiving circuit. A typical example of the wireless portable device using the wireless receiving circuit is a mobile phone. It is a self-evident fact that the timing of releasing a new product of mobile phone has a significant influence on the sales share of the mobile phone. Furthermore, the length of stand-by time and talk time of the mobile phone, which are determined by the total power consumption of the members of the mobile phone, are important factors for consumers in choosing which mobile phone to purchase.

The capacitors 12 to 15 and 18 (distributed filter) are not limited to those connected between the output terminal of each functional block (the mixers 5, 6, the buffers 7, 8, and the image rejection filter 16) and the ground. The capacitors 12 to 15 and 18 may be between the output terminal and the ground in terms of alternating current. In other words, each of the capacitors 12 to 15 and 18 may have one terminal connected to the output terminal of a functional block (the mixer 5 or 6, the buffer 7 or 8, or the image rejection filter 16) and the other terminal grounded in terms of alternating current, without being connected to the ground. Therefore, for example, each of the capacitors 12 to 15 and 18 may be inserted between the output terminal of a functional block (the mixer 5 or 6, the buffer 7 or 8, or the image rejection filter 16) and a power source for supplying electric power to the functional block.

If the outputs of the mixers 5, 6 are differential outputs, the capacitors may be provided between the differential outputs. That is, if the outputs of the mixers 5, 6 of the wireless receiving circuit of the present invention are differential outputs as in the first and second embodiments, the capacitors 12 to 15 (distributed filter) may be differential (balanced) filters. An example of such an arrangement is described below, with reference to FIG. 4.

Figure 4:
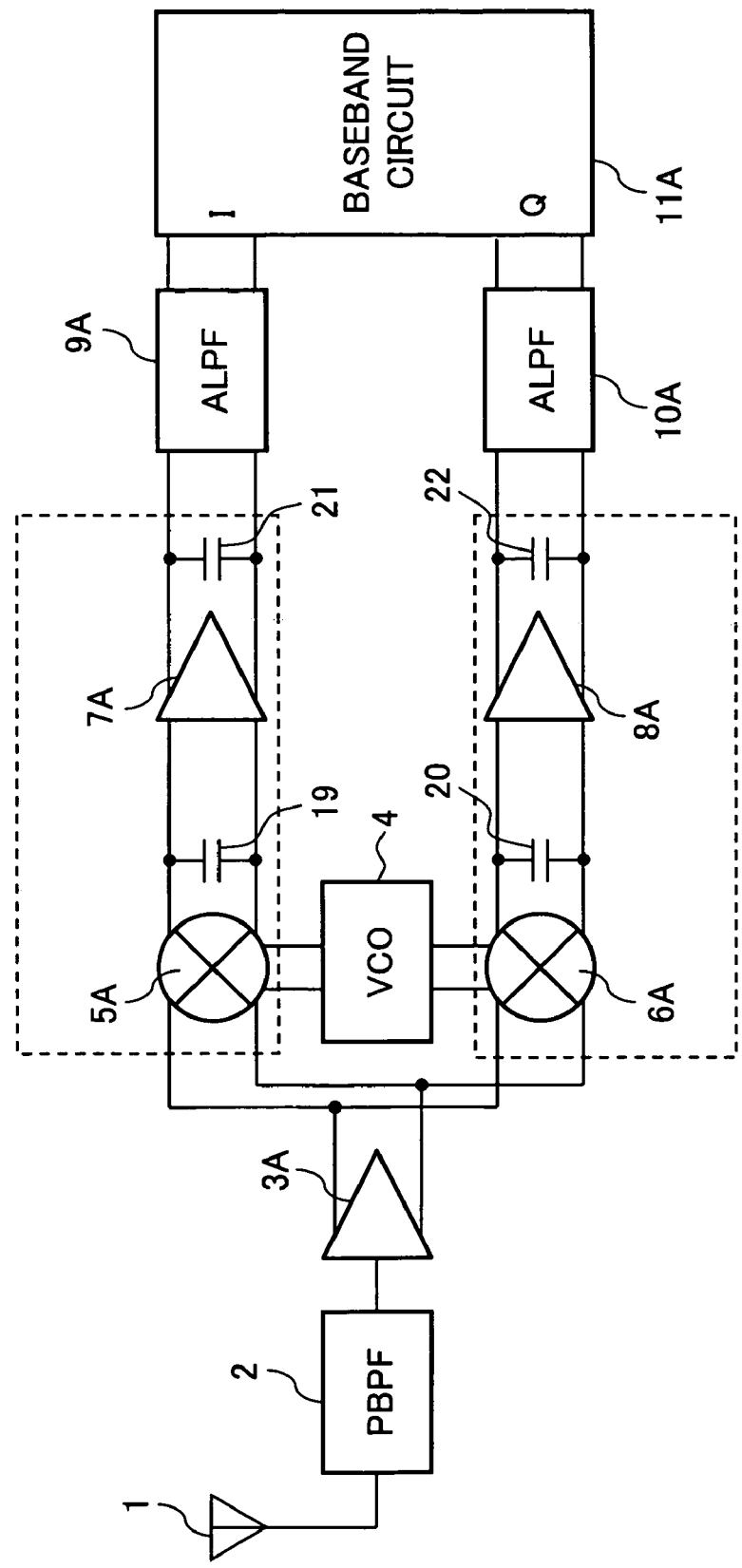
FIG. 4 is a block diagram illustrating one variation example of the wireless receiving circuit in accordance with the first embodiment of the present invention.

In the wireless receiving circuit of this variation example, as shown in FIG. 4, the low-noise amplifier 3 of the wireless receiving circuit of FIG. 1 is replaced by a low-noise amplifier 3A having a single-end (unbalanced) input and a differential (balanced) output. The voltage control oscillator (VCO) 4 is replaced by a voltage oscillator 4A having differential outputs. The mixers 5, 6 are replaced by mixers 5A, 6A having differential input and output. The buffers 7, 8 are replaced by buffers 7A, 8A having differential input and output. The active low-pass filters 9, 10 are replaced by active low-pass filters 9A, 10A having differential input and output. The baseband circuit 11 is replaced by a baseband circuit 11A having differential input. The wireless receiving circuit of this variation example includes capacitors 19 to 22, instead of the capacitors 12 to 15. Each of the capacitors 19 to 22 is inserted between the differential outputs of the mixer 5A or 6A, or the buffers 7A or 8B. Like the capacitors 12 to 15, the capacitors 19 to 22 function as a second order low-pass filter by being combined with output impedance of the mixers 5A, 6A, which are elements directly preceding the capacitors 19 to 22 (preceding-stage circuits), and input impedance of the buffers 7A, 8A and the active low-pass filters 9A, 10A, which are elements directly following the capacitors 19 to 22 (following-stage circuits).

The distributed filter can also be realized by connecting capacitors between (i) output or input of a smaller functional unit in a functional block (smaller than the functional block) and (ii) the ground. For example, in the wireless receiving circuit 1 of FIG. 1, the parts surrounded by the rectangles of dotted lines can be seen as mixers, and each of these parts can be a functional block. That is, the members surrounded by the rectangles of dotted lines (the mixers 5, 6 and the buffers 7, 8) can be considered as a functional block including the mixer 5 (mixer core) and the buffer 7, and a functional block including the mixer 6 (mixer core) and the buffer 8. If these members are considered as such functional blocks, it can be said that each of the capacitors 12 and 13 is connected to the output terminal of a mixer core, which is a functional unit in the functional block smaller than the functional block.

The distributed filter in the first embodiment is a second order filter, and the distributed filter in the second embodiment is a third order filter. However, the number of stages of the distributed filter can be changed arbitrarily, by changing the number of capacitors provided in a distributed manner. For example, in the wireless receiving circuit of the second embodiment, by adding a certain functional block (e.g. an amplifier, described later) on the upstream side of the active low-pass filter 17 and connecting, to the output terminal of the functional block, one terminal of a capacitor having the other terminal grounded, the number of stages of the distributed filter may be increased up to four.

Although not shown in FIG. 1 and FIG. 2, a (variable-gain) amplifier may be provided on the upstream side of the active low-pass filters 9, 10, and 17. This amplifier usually has a plurality of stages. Therefore, if the (variable-gain) amplifier is provided on the upstream side of the active low-pass filters 9, 10 and/or the active low-pass filter 17, one terminal of a capacitor having the other end grounded may be connected to the output terminal of each stage of the (variable-gain) amplifier. If the (variable-gain) amplifier is provided and one terminal of a capacitor having the other end grounded is connected to the output terminal of each stage of the (variable-gain) amplifier, the buffers 7, 8, and the capacitors 12 to 15, each of which is connected to the input terminal or output terminal of the buffer 7 or 8, may be omitted.

The distributed filter may be used not only as a filter having a function of removing the high-frequency interfering wave to which the active low-pass filters 9, 10, and 17 are ineffective, but also as a filter having other function(s). For example, if the active low-pass filters 9, 10, and 17 are switched capacitor filters, aliasing components (signals at frequencies higher than the desired channel) could be mixed into the input signals of the baseband circuit 11 through the switched capacitor filters 9, 10, and 17, and thereby hinder demodulation of the input signals of the baseband circuit 11. In order to prevent the aliasing components from being mixed into the input signals of the baseband circuit 11 through the switched capacitor filters 9, 10, and 17, and from hindering the demodulation of the input signals of the baseband circuit 11, an antialiasing filter for removing the aliasing components (antialiasing) must be provided on the upstream side of the active filter 9. The antialiasing filter can be realized by the distributed filter, that is, the second order filter realized by the capacitors 12 to 15 or the third order filter realized by the capacitors 12 to 15 and 18. In this case, the cutoff frequency of the distributed filter could be only several times higher than the cutoff frequency of the active low-pass filters 9, 10, and 17. Therefore, in determining the capacitances of the capacitors 12 to 15 and 18, it is necessary to consider production tolerance and temperature-induced fluctuation of (i) the capacitors 12 to 15 and 18 used in the distributed filter, (ii) output impedance of the functional block directly preceding the capacitors 12 to 15 and 18, and (iii) input impedance of the functional block directly following the capacitors 12 to 15 and 18. It is not necessary to use all of the capacitors 12 to 15 and 18 for the purpose of antialiasing. It is preferable to minimize the number of capacitors among the capacitors 12 to 15 and 18 (which are part of the distributed filter) used to perform the antialiasing function, and set, to the rest of the capacitors, low enough capacitances to prevent unnecessary attenuation of the high-frequency interfering wave, so that the rest of the capacitors have a function of removing the high-frequency interfering wave to which the active low-pass filters 9, 10, and 17 are ineffective. With this arrangement, it is possible to prevent attenuation by the distributed filter in the passing band of the active low-pass filters 9, 10, and 17.

This example of using the distributed filter as an antialiasing filter can be developed further. For example, an analog/digital converter may be provided on the upstream side of the active low-pass filters 9, 10 or the active low-pass filter 17, and thereby transform the active low-pass filters 9, 10 or the active low-pass filter 17 into digital filter(s).

Figure 5:
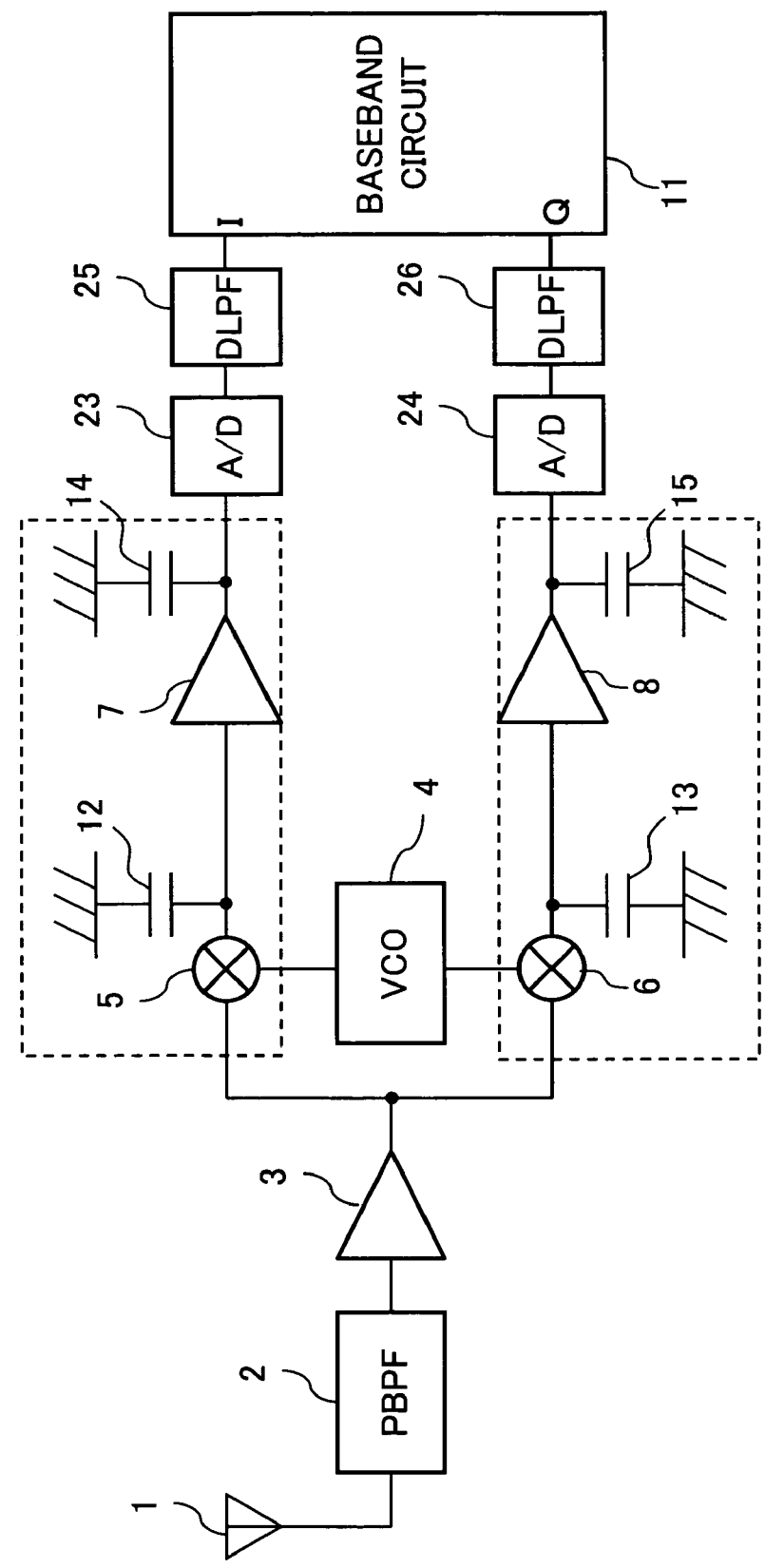
FIG. 5 is a block diagram illustrating another variation example of the wireless receiving circuit in accordance with the first embodiment of the present invention.
Figure 6:
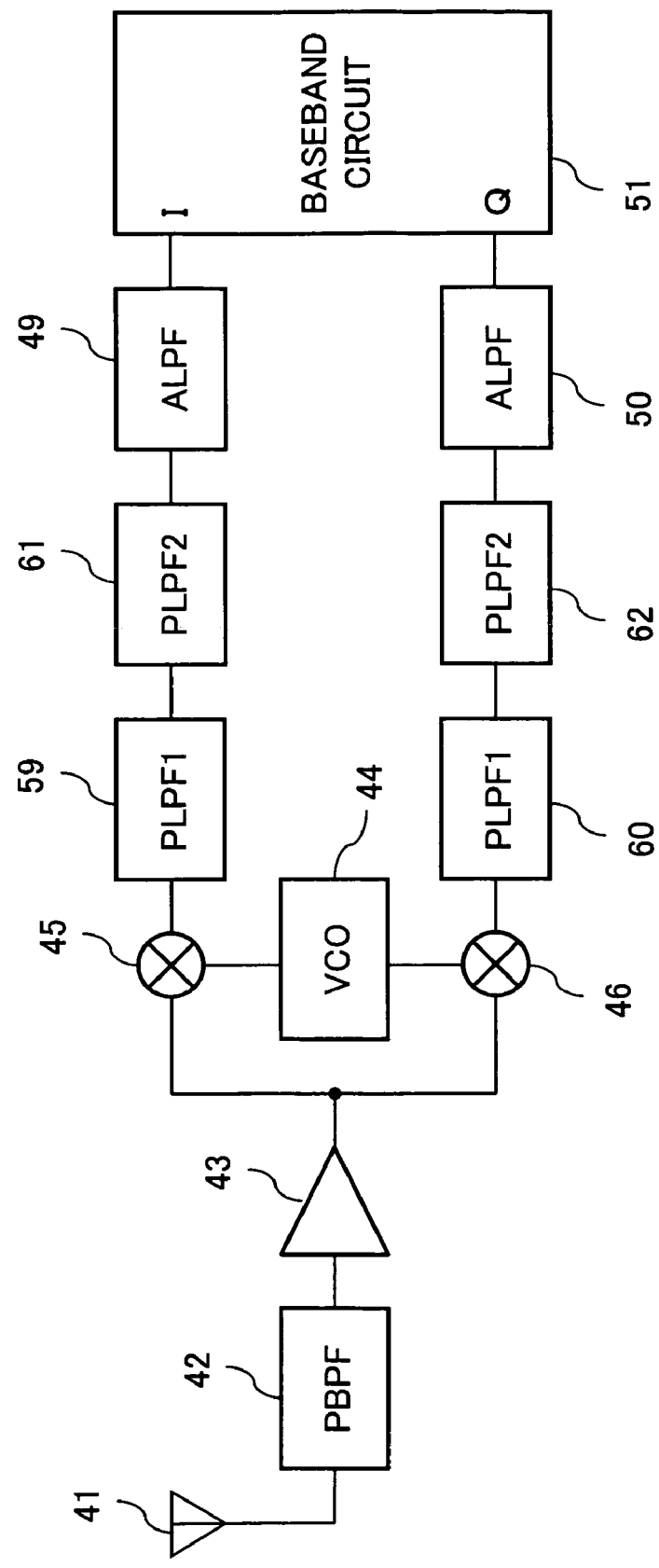
FIG. 6 is a block diagram illustrating an arrangement of a wireless receiving circuit in accordance with a prior art.

The following describes this variation example with reference to FIG. 5. As shown in FIG. 5, the wireless receiving circuit of this variation example has the same arrangement as the wireless receiving circuit of FIG. 1, except that analog/digital converters 23, 24 and digital low-pass filters 25, 26 are provided as a third element, instead of the active low-pass filters 9, 10. The analog/digital converters 23, 24 convert output signals of the buffers 7, 8 into digital signals.

The digital low-pass filters 25, 26 remove an interfering wave that is not in the desired channel, from the digital signals. Also in this case, a digital band pass filter may be used instead of the digital low-pass filters 25, 26.

In this case, since digital filters are far easier to design than analog active filters, the development period for the wireless receiving circuit is expected to be shortened. Moreover, as described above, if the wireless receiving circuit is integrated into an IC, chip area of digital filters can be reduced more than that of analog active filters. In particular, if the baseband circuit 11 includes a digital circuit, and the digital circuit is provided with a digital signal processor (DSP), the DSP can realize the function of the digital filters. Therefore, chip area exclusively for the digital filters is not required.

The distributed filter may have a function of preventing functional blocks (elements) from being saturated with an interfering wave. Saturation of functional blocks with an interfering wave is not a problem for only the active filter(s) provided on the downstream side of the distributed filter. As described above, there are cases where the level of the interfering wave is high. When the high-level interfering wave is directly inputted to other functional blocks, the functional blocks are saturated, and the signal of the desired channel is distorted significantly. The distributed filter may be used in order to attenuate the interfering wave. For example, if saturation of the image rejection filter 16 in the wireless receiving circuit of FIG. 3 is likely, the level of the interfering wave may be reduced to be lower than a saturation level of the image rejection filter 16, by using the distributed filter realized by the capacitors 12 to 15. In this case, for example, if the high-frequency interfering wave can be attenuated by the second order distributed filter so as to be lower than the saturation level of the image rejection filter 16, the capacitor 18 may be omitted. Thus, where to provide capacitors and how many capacitors to provide at each position in the distributed filter depend on such factors as the kind of the interfering wave and the situation of each functional block. Since the distributed filter can be designed easily, optimal positions of the capacitors and optimal characteristic values (capacitances) of the capacitors can be determined easily through trial and error in simulation or the like, without changing other circuit-element parameters. This designing is much easier than in the case where the distributed filter is realized by providing RC filters separately.

From the viewpoint of removing the interfering wave, the distributed filter of the present invention realized by a plurality of capacitors can be realized in a high-frequency functional block provided on the upstream side of the mixers 5, 6. In this case, the distributed filter removes an interfering wave at a super-high frequency of several GHz. Furthermore, the distributed filter is also applicable to functional blocks of the heterodyne architecture, other than the low IF architecture. Also in this case, there is an advantage that the distributed filter can be designed easily.

The present invention is not limited to the foregoing embodiments. The same may be varied in many ways within the scope of the claims. Any embodiment conceived by appropriately combining technical means disclosed in different embodiments is also included within the technical means of the present invention.

A wireless receiving circuit of the present invention for downconverting (lowering frequencies of) high-frequency wireless signals received by an antenna and picking up a signal of a desired channel, the wireless receiving circuit includes: a first element, a second element, and a third element serially connected in this order between a signal input terminal and a signal output terminal; a first capacitor, one terminal of which is connected to an input terminal of the second element; and a second capacitor, one terminal of which is connected to an output terminal of the second element, the first capacitor and the second capacitor functioning as a second order low-pass filter by being combined with output impedance of an element immediately preceding the first capacitor and the second capacitor, and input impedance of an element immediately following the first capacitor and the second capacitor.

In this specification, an "element" includes not only a functional block consisting of a group of elements that perform a certain function by themselves, but also one or a group of plural elements constituting a functional block. An "element immediately preceding (the first capacitor and the second capacitor)" is an element having an output terminal connected to one terminal of the first capacitor or the second capacitor, and an "element immediately following (the first capacitor and the second capacitor)" is an element having an input terminal connected to one terminal of the first capacitor or the second capacitor.

The first capacitor may be connected to the output terminal of the first element directly or may be connected through another element. The second capacitor may be connected to an input terminal of the third element directly or may be connected through another element.

The wireless receiving circuit of the present invention is particularly suitable as a wireless receiving circuit of a direct conversion architecture, which downconverts high-frequency wireless signals received by an antenna and picks up a signal of a desired channel, and as a wireless receiving circuit of a low IF architecture, which downconverts high-frequency wireless signals received by an antenna into a lower intermediate frequency signal (an intermediate frequency signal at a frequency about several times higher than a baseband signal range) and picks up a signal of a desired channel.

It is preferable that, in addition to having the foregoing arrangement, the wireless receiving circuit of the present invention is arranged so that the first element is a mixer for downconverting the high-frequency wireless signals by mixing the high-frequency wireless signals with local oscillation signals (in particular, downconverting into baseband signals or intermediate frequency signals at a low frequency of about several times higher than the baseband signal range). With this arrangement, it becomes possible to remove high-frequency components at relatively low frequencies, by a second order low-pass filter.

The wireless receiving circuit of the present invention having the foregoing arrangement (having a mixer as the first element) may be arranged so that the third element is an active filter for attenuating high-frequency components of the downconverted signals; and the first capacitor and the second capacitor function, as low-pass filters for attenuating high-frequency components that are not attenuated by the active filter, by being combined with output impedance of an element immediately preceding the first capacitor and the second capacitor, and input impedance of an element immediately following the first capacitor and the second capacitor.

According to this arrangement, it becomes possible to remove, by the low-pass filter of the first and second capacitors, an interfering wave having high-frequency components that cannot be removed by the active filter when the frequency of the desired channel is lowered by the mixer and the frequency of the interfering wave is lowered by the mixer but still higher than the desired channel. Therefore, it is possible to prevent the interfering wave from adversely affecting signal demodulation.

The "active filter" is a filter arranged by combining an active element (e.g. an operational amplifier, a transistor, or the like) and a passive element (e.g. a resistor, a capacitor, an inductor, or the like).

The wireless receiving circuit of the present invention having the foregoing arrangement (having a mixer as the first element) may be arranged so that the third element is a switched capacitor filter; and the first capacitor and the second capacitor function, as antialiasing filters for removing aliasing components, by being combined with output impedance of an element immediately preceding the first capacitor and the second capacitor, and input impedance of an element immediately following the first capacitor and the second capacitor.

According to this arrangement, an antialiasing filter, which should be provided on the upstream side of the switched capacitor so as to remove aliasing components, can be realized by the first and second capacitors. If the frequency of the desired channel is lowered by the mixer, the aliasing components at frequencies higher than the frequency of the desired channel can be removed by the antialiasing filter of the first and second capacitors. Therefore, it is possible to prevent the interfering wave from adversely affecting signal demodulation.

The wireless receiving circuit of the present invention having the foregoing arrangement (having a mixer as the first element) may be arranged so that the third element is an analog/digital converter for converting an analog signal of the desired channel into a digital signal; and the first capacitor and the second capacitor function, as antialiasing filters for removing aliasing components, by being combined with output impedance of an element immediately preceding the first capacitor and the second capacitor, and input impedance of an element immediately following the first capacitor and the second capacitor.

According to this arrangement, an antialiasing filter, which should be provided on the upstream side of the analog/digital converter so as to remove aliasing components, can be realized by the first and second capacitors. If the frequency of the desired channel is lowered by the mixer, the aliasing components at frequencies higher than the frequency of the desired channel can be removed by the antialiasing filter of the first and second capacitors. Therefore, it is possible to prevent the interfering wave from adversely affecting signal demodulation.

The wireless receiving circuit of the present invention having the foregoing arrangement (having a mixer as the first element) may be arranged so that the second element is an amplifier (preferably a buffer circuit). According to this arrangement, the amplifier is provided between the first capacitor and the second capacitor. Therefore, (i) the first order low-pass filter realized by the combination of the first capacitor and the elements provided on the upstream side and downstream side of the first capacitor and (ii) the first order low-pass filter realized by the combination of the second capacitor and the elements provided on the upstream side and downstream side of the second capacitor are unlikely to affect characteristics of each other. As a result, it becomes easier to design the first and second capacitors and the elements provided on the upstream side and downstream side of the first and second capacitors.

The wireless receiving circuit of the present invention having the foregoing arrangement (having a mixer as the first element) may further include: a fourth element connected between the output terminal of second element and an input terminal of the third element; and a third capacitor, one terminal of which is connected to an output terminal of the fourth element, the first, second, and third capacitors functioning as a third order low-pass filter by being combined with output impedance of an element immediately preceding the first, second, and third capacitors, and input impedance of an element immediately following the first, second, and third capacitors with this arrangement, it becomes possible to realize a wireless receiving circuit including a third order low-pass filter that can be designed easily.

The wireless receiving circuit having the foregoing arrangement may be arranged so that each of the first capacitor and the second capacitor prevents following-stage elements from being saturated with an interfering wave.

Each element has a different input level at which it is saturated by a high-frequency interfering wave. According to the foregoing arrangement, the capacitors are positioned so that the elements will not be saturated. In doing so, at the time of designing, the positions and capacitances of the capacitors can be optimized without adjusting other circuit parameters.

It is preferable that the wireless receiving circuit having the foregoing arrangement is arranged so that at least a series of elements from an element immediately preceding the first capacitor to an element immediately following the second capacitor are integrated into an integrated circuit. With this arrangement, the wireless receiving circuit can be further miniaturized.

A wireless portable device of the present invention includes the wireless receiving circuit of the present invention.

According to the wireless receiving circuit of the present invention, a second order low-pass filter can be realized only by the first and second capacitors connected to the input and output terminals of the second element. Therefore, the filters cause almost no loss in the passing band. As a result, the wireless receiving circuit can be designed easily, without requiring serious consideration of the loss in the passing band caused by inserting the filters, and the impedance matching between the filters and the circuits provided on the upstream side and downstream side of the filters.

Moreover, since it is not necessary to add a buffer for the impedance matching between the filters and the circuits provided on the upstream side and downstream side of the filters and an amplifier circuit for covering the loss caused by inserting the filters, it is possible to prevent increase of power consumption.

According to the wireless receiving circuit, it is not necessary that the series of elements from the element immediately preceding the first capacitor to the element immediately following the second capacitor are inductors having high inductance values. Therefore, main elements, that is, at least the series of elements from the element immediately preceding the first capacitor to the element immediately following the second capacitor, can be integrated into an integrated circuit.

By using the wireless receiving circuit in the wireless portable device, it is possible to shorten the development period for the wireless portable device, increase the operating time of a battery of the wireless portable device (reduce power consumption), and miniaturize the wireless portable device.

As described above, the wireless receiving circuit of the present invention may be a wireless receiving circuit for amplifying and frequency-modulating high-frequency wireless signals received by an antenna and picking up a signal of a desired channel, the wireless receiving circuit including: capacitors connected to at least two outputs and an AC ground, or, if the at least two outputs are differential outputs, between the differential outputs, the at least two outputs being selected from (i) outputs of functional blocks that are parts of the wireless receiving circuit and (ii) outputs of elements in the functional blocks, the capacitors being provided so as to realize low-pass filters in a distributed manner.

According to this wireless receiving circuit, low-pass filters can be realized easily by connecting a capacitor between the output of each functional block and the AC ground. The number of stages of the filters can be changed by changing the number of capacitors provided in a distributed manner. Thus, the filters can be designed easily, without requiring serious consideration of the insertion loss in the passing band caused by the capacitors and of the impedance matching.

As a matter of course, since the "output" of each functional block is the input of the next functional block, it can be said that each capacitor of the filters provided in a distributed manner is connected between the input of each functional block and the AC ground.

The wireless receiving circuit of the present invention may be a wireless receiving circuit, including: a mixer; an active filter; and capacitors connected to at least two outputs and an AC ground, or, if the at least two outputs are differential outputs, between the differential outputs, the at least two outputs being selected from (i) outputs of functional blocks from an output of the mixer to an input of the active filter (including the output of the mixer) and (ii) outputs of elements in the functional blocks from the output of the mixer to the input of the active filter, the capacitors being provided so as to realize low-pass filters in a distributed manner and so that the low-pass filters attenuates high-frequency components to which the active filter is ineffective.

According to this arrangement, the filters realized by the capacitors can remove the high-frequency interfering wave that cannot be attenuated by the active filter, if the frequency of the desired channel is lowered by the mixer and the frequency of the interfering wave is lowered by the mixer but still sufficiently higher than the desired channel. Therefore, it is possible to prevent the interfering wave from adversely affecting signal demodulation.

The wireless receiving circuit of the present invention may be a wireless receiving circuit, including: a mixer; a switched capacitor filter; and capacitors connected to at least two outputs and an AC ground, or, if the at least two outputs are differential outputs, between the differential outputs, the at least two outputs being selected from (i) outputs of functional blocks from an output of the mixer to an input of the switched capacitor filter (including the output of the mixer) and (ii) outputs of elements in functional blocks from the output of the mixer to an input of an analog/digital converter, the capacitors being provided so as to realize antialiasing filters in a distributed manner.

According to the foregoing arrangement, an antialiasing filter is required on the upstream side of the switched capacitor. If the frequency of the desired channel is lowered by the mixer, the filters realized by the capacitors can remove aliasing components at frequencies higher than the desired channel. Therefore, it is possible to prevent the interfering wave from adversely affecting signal demodulation.

The wireless receiving circuit of the present invention may be a wireless receiving circuit, including: a mixer; an analog/digital converter; and capacitors connected to at least two outputs and an AC ground, or, if the at least two outputs are differential outputs, between the differential outputs, the at least two outputs being selected from (i) outputs of functional blocks from an output of the mixer to an input of the analog/digital converter (including the output of the mixer) and (ii) outputs of elements in functional blocks from the output of the mixer to the input of the analog/digital converter, the capacitors being provided so as to realize antialiasing filters in a distributed manner.

According to the foregoing arrangement, an antialiasing filter is required on the upstream side of the switched capacitor. If the frequency of the desired channel is lowered by the mixer, the filters realized by the capacitors can remove aliasing components at frequencies higher than the desired channel. Therefore, it is possible to prevent the interfering wave from adversely affecting signal demodulation.

The low-pass filters provided in a distributed manner may be such that each of the capacitors, which is a part of the low-pass filters, is positioned so as to prevent each functional block provided on the downstream side of the capacitor from being saturated with an interfering wave.

Each functional block has a different input level at which it is saturated by a high-frequency interfering wave. According to the foregoing arrangement, the capacitors are positioned so that the functional blocks will not be saturated. In doing so, at the time of designing, the positions and capacitances of the capacitors can be optimized without adjusting other circuit parameters.

In the wireless receiving circuit of the present invention, main functional blocks may be mostly integrated into an IC.

In integrating main functional blocks of the wireless receiving circuit of the present invention, the filters realized by providing the capacitors in a distributed manner can be designed easily, because it is not necessary to consider seriously the insertion loss and the impedance matching with the circuits provided on the upstream side and downstream side of the capacitors. Moreover, since it is not necessary to add a circuit such as a buffer, it is possible to prevent increase of power consumption.

A wireless portable device of the present invention may include the wireless receiving circuit of the present invention whose main functional blocks are mostly integrated into an IC.

By using the wireless receiving circuit whose main functional blocks are mostly integrated into an IC in the wireless portable device, it is expected that the development period for the wireless portable device is shortened and the operating time of the wireless portable device is prolonged.

The wireless receiving circuit of the present invention is applicable to such wireless portable devices as mobile phones and portable telereceivers.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A wireless receiving circuit for downconverting high-frequency wireless signals received by an antenna and picking up a signal of a desired channel, the wireless receiving circuit comprising:

a first element, a second element, and a third element serially connected in this order between a signal input terminal and a signal output terminal;

a first capacitor, one terminal of which is connected to an input terminal of the second element; and a second capacitor, one terminal of which is connected to an output terminal of the second element, the first capacitor and the second capacitor functioning as a second order low-pass filter by being combined with output impedance of an element immediately preceding the first capacitor and the second capacitor, and input impedance of an element immediately following the first capacitor and the second capacitor wherein the first element is a mixer for downconverting the high-frequency wireless signals by mixing the high-frequency wireless signals with local oscillation signals.

2. The wireless receiving circuit as set forth in claim 1, wherein:

the third element is an active filter for attenuating high-frequency components of the downconverted signals; and the first capacitor and the second capacitor function, as low-pass filters for attenuating high-frequency components that are not attenuated by the active filter, by being combined with output impedance of an element immediately preceding the first capacitor and the second capacitor, and input impedance of an element immediately following the first capacitor and the second capacitor.

3. The wireless receiving circuit as set forth in claim 1, wherein:

the third element is a switched capacitor filter; and the first capacitor and the second capacitor function, as antialiasing filters for removing aliasing components, by being combined with output impedance of an element immediately preceding the first capacitor and the second capacitor, and input impedance of an element immediately following the first capacitor and the second capacitor.

4. The wireless receiving circuit as set forth in claim 1, wherein:

the third element is an analog/digital converter for converting an analog signal of the desired channel into a digital signal; and the first capacitor and the second capacitor function, as antialiasing filters for removing aliasing components, by being combined with output impedance of an element immediately preceding the first capacitor and the second capacitor, and input impedance of an element immediately following the first capacitor and the second capacitor.

5. The wireless receiving circuit as set forth in claim 1, further comprising:

a fourth element connected between the output terminal of second element and an input terminal of the third element; and a third capacitor, one terminal of which is connected to an output terminal of the fourth element, the first, second, and third capacitors functioning as a third order low-pass filter by being combined with output impedance of an element immediately preceding the first, second, and third capacitors, and input impedance of an element immediately following the first, second, and third capacitors.

6. The wireless receiving circuit as set forth in claim 1, wherein:

the second element is an amplifier.

7. The wireless receiving circuit as set forth in claim 1, wherein:

each of the first capacitor and the second capacitor prevents following-stage elements from being saturated with an interfering wave.

8. The wireless receiving circuit as set forth in claim 1, wherein:

at least a series of elements from an element immediately preceding the first capacitor to an element immediately following the second capacitor are integrated into an integrated circuit.

9. A wireless portable device, comprising:

a wireless receiving circuit for downconverting high-frequency wireless signals received by an antenna and picking up a signal of a desired channel, the wireless receiving circuit including:

a first element, a second element, and a third element serially connected in this order between a signal input terminal and a signal output terminal;

a first capacitor, one terminal of which is connected to an input terminal of the second element; and a second capacitor, one terminal of which is connected to an output terminal of the second element, the first capacitor and the second capacitor functioning as a second order low-pass filter by being combined with output impedance of an element immediately preceding the first capacitor and the second capacitor, and input impedance of an element immediately following the first capacitor and the second capacitor wherein the first element is a mixer for downconverting the high-frequency wireless signals by mixing the high-frequency wireless signals with local oscillation signals.

10. A wireless receiving circuit, comprising:

a band pass filter for allowing passage of only a signal in a desired frequency range, among high-frequency wireless signals received by an antenna;

an amplifier for amplifying the signal that has passed through the band pass filter;

first and second mixers for mixing the output signal of the amplifier with signals at a local oscillation frequency, so as to downconvert the output signal of the amplifier into an inphase signal and a quadrature signal, which are two baseband signals having a 90-degree phase difference;

first and second active low-pass filters for respectively removing, from the inphase signal and the quadrature signal, an interfering wave that is in a frequency range other than the desired channel;

a baseband circuit for processing the inphase signal and the quadrature signal from which the interfering wave has been removed;

a first buffer provided between the first mixer and the first active low-pass filter;

a second buffer provided between the second mixer and the second active low-pass filter;

a first capacitor, one terminal of which is connected to an input terminal of the first buffer;

a second capacitor, one terminal of which is connected to an input terminal of the second buffer;

a third capacitor, one terminal of which is connected to an output terminal of the first buffer; and a fourth capacitor, one terminal of which is connected to an output terminal of the second buffer.

11. The wireless receiving circuit as set forth in claim 10, wherein:

the capacitors function as a second order low-pass filter by being combined with output impedance of an element immediately preceding the capacitors and input impedance of an element immediately following the capacitors.

12. The wireless receiving circuit as set forth in claim 10, further comprising:
a voltage control oscillator for generating two signals having a 90-degree phase difference at a frequency equal to a center frequency of the desired channel, and respectively supplying the two signals to the first and second mixers, as the signals at a local oscillation frequency.

13. The wireless receiving circuit as set forth in claim 10, wherein:
the capacitors function as a third order low-pass filter by being combined with output impedance of an element immediately preceding the capacitors and input impedance of an element immediately following the capacitors.

14. A wireless receiving circuit, comprising:
a band pass filter for allowing passage of only a signal in a desired frequency range, among high-frequency wireless signals received by an antenna;
an amplifier for amplifying the signal that has passed through the band pass filter;
first and second mixers for mixing the output signal of the amplifier with signals at a local oscillation frequency, so as to downconvert the output signal of the amplifier into an inphase signal and a quadrature signal, which are two baseband signals having a 90-degree phase difference;
an image rejection filter for removing image signals in an intermediate frequency range from the inphase signal and the quadrature signal and outputting the inphase signal and the quadrature signal as a single signal;
an active low-pass filter for removing, from the output signal of the image rejection filter, an interfering wave that is in a frequency range other than the desired channel;
a baseband circuit for processing the signal from which the interfering wave has been removed;
a first buffer provided between the first mixer and the image rejection filter;
a second buffer provided between the second mixer and the image rejection filter;
a first capacitor, one terminal of which is connected to an input terminal of the first buffer;
a second capacitor, one terminal of which is connected to an input terminal of the second buffer;
a third capacitor, one terminal of which is connected to an output terminal of the first buffer;
a fourth capacitor, one terminal of which is connected to an output terminal of the second buffer; and
a fifth capacitor, one terminal of which is connected to an output terminal of the image rejection filter.

15. The wireless receiving circuit as set forth in claim 14, further comprising:
a voltage control oscillator for generating two signals having a 90-degree phase difference at a frequency equal to a center frequency of the desired channel, and respectively supplying the two signals to the first and second mixers, as the signals at a local oscillation frequency.

* * * * *